(12) United States Patent
Lavoie et al.

(10) Patent No.: US 11,379,879 B1
(45) Date of Patent: Jul. 5, 2022

(54) METHOD, REFERRAL SERVER AND NETWORK FOR PROVIDING TARGETED ADVERTISEMENTS TO USERS

(71) Applicant: FLINKS TECHNOLOGY INC., Montreal (CA)

(72) Inventors: Frederick Lavoie, Toronto (CA); Yves-Gabriel Leboeuf, Saint-Lambert (CA); Karim Lahrichi, Laval (CA); Julien Dube-Cousineau, Montreal (CA); Dominique Samson, Montreal (CA)

(73) Assignee: FLINKS TECHNOLOGY INC., Montreal (CA)

( * ) Notice: Subject to any disclaimer, the term of this patent is extended or adjusted under 35 U.S.C. 154(b) by 0 days.

(21) Appl. No.: 17/106,009

(22) Filed: Nov. 27, 2020

Related U.S. Application Data (60) Provisional application No. 62/941,399, filed on Nov. 27, 2019.

(51) Int. Cl.
   *G06Q 30/02* (2012.01)
(52) U.S. Cl.
   CPC ..... *G06Q 30/0269* (2013.01); *G06Q 30/0243* (2013.01); *G06Q 30/0246* (2013.01)
(58) Field of Classification Search
   CPC .......... G06Q 30/0269; G06Q 30/0243; G06Q 30/0246
   See application file for complete search history.

(56) References Cited

U.S. PATENT DOCUMENTS

| 10,817,804 | B1 * | 10/2020 | Ozoka | G06N 5/048 |
| 2005/0015296 | A1 * | 1/2005 | Dougan | G06Q 30/02 705/36 R |
| 2008/0085675 | A1 * | 4/2008 | Rao | G06Q 30/02 455/2.01 |
| 2008/0306808 | A1 * | 12/2008 | Adjali | G06Q 30/0204 705/7.32 |
| 2009/0254633 | A1 * | 10/2009 | Olive | G06Q 30/02 709/218 |

(Continued)

OTHER PUBLICATIONS

Rover, Carla; "Explainer: Why Pixel Tracking is Increasingly Popular", Nov. 2, 2011 (Year: 2011).*

(Continued)

*Primary Examiner* — Hajime Rojas
*Assistant Examiner* — Kyle G Robinson
(74) *Attorney, Agent, or Firm* — BCF LLP (57) ABSTRACT

For providing a targeted advertisement to a user, a referral server sends, to a financial platform server, a request for fetching the financial information of the user. The referral server receives, from the financial platform server, a reply containing the financial information of the user. The referral server analyses the financial information of the user to determine one or more behavioural attributes of the user. The referral server uses the one or more behavioural attributes of the user to define a behavioural profile of the user. The referral server may send to a device of the user a code sequence related to a marketing campaign selected according to the behavioural profile of the user. The marketing campaign may be selected by calculating a conversion rate for each of a plurality of marketing campaigns.

12 Claims, 7 Drawing Sheets

(56) References Cited

U.S. PATENT DOCUMENTS

| | | | |
|---|---|---|---|
| 2011/0166931 A1* | 7/2011 | Joa | G06Q 30/02 |
| | | | 705/14.53 |
| 2011/0166977 A1* | 7/2011 | Krein | G06Q 40/00 |
| | | | 705/35 |
| 2014/0236716 A1* | 8/2014 | Shapiro | G06Q 50/01 |
| | | | 705/14.66 |
| 2017/0070476 A1* | 3/2017 | Massoudi | H04L 67/306 |
| 2017/0330231 A1* | 11/2017 | Wayne | G06Q 50/165 |
| 2018/0253759 A1* | 9/2018 | Deng | G06Q 30/0243 |
| 2019/0303994 A1* | 10/2019 | Sesia | G06Q 30/0254 |
| 2019/0355004 A1* | 11/2019 | Watkins | G06Q 30/0205 |
| 2021/0075793 A1* | 3/2021 | Dunjic | H04L 63/0884 |

OTHER PUBLICATIONS

Lu et al., "Contextual Multi-Armed Bandits", Proceedings of the 13th International Conference on Artificial Intelligence and Statistics, JMLR Workshop and Conference Proceedings 9:485-492, 2010.

\* cited by examiner

METHOD, REFERRAL SERVER AND NETWORK FOR PROVIDING TARGETED ADVERTISEMENTS TO USERS

CROSS-REFERENCE

The present application claims priority from United States Provisional Patent Application No. 62/941,399, filed on Nov. 27, 2019, the disclosure of which is incorporated by reference herein in its entirety.

FIELD

The present technology relates to advertisements over the Internet. In particular, the present technology relates to a method, a referral server and a network for providing targeted advertisements to users.

BACKGROUND

It is virtually impossible today to access the Internet without being subjected to a mass of advertisement messages. While many such advertisements are randomly provided, an increasing number of advertisements are targeted based on recent browsing activity of a user.

For example, a user having recently searched for a piece of plumbing equipment will see ads for the same type of equipment on many different pages accessed in the next several days or weeks.

This manner of providing targeted advertisement may be highly inefficient. Continuing with the above example, if the user has purchased the sought for piece of plumbing equipment, chances are that she/he will no longer need to make the same purchase in the foreseeable future. Presenting the same targeted advertisement will likely not result in a new purchase. In another example, a user may search the Internet for expensive cars that they cannot afford. Presenting such cars in targeted advertisements may be futile.

In a further example, a user might benefit from receiving targeted advertisements for products or services that she/he may not have been searching, for example financial services. For example, some users lack awareness of the need to invest in view of their eventual retirement. Current targeted advertisement methods that are based on past searches made by the user cannot provide information about such products or services.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) display of targeted advertisements for products or services that a user has already purchased; (2) display of targeted advertisements for products or services that a user cannot afford; and/or (3) provision of targeted advertisements for products or services that do not relate to recent Internet searches by a user.

In one aspect, various implementations of the present technology provide a method for providing a targeted advertisement to a user, comprising:
  sending, by a referral server, to a financial platform server, a request for fetching the financial information of the user;
  receiving, at the referral server, from the financial platform server, a reply containing the financial information of the user;
  analysing, at the referral server, the financial information of the user to determine one or more behavioural attributes of the user; and
  using, at the referral server, the one or more behavioural attributes of the user to define a behavioural profile of the user.

In some embodiments of the present technology, the method further comprises: receiving, at the referral server, from a client device, a request to access an account of the user hosted in the financial platform server; and establishing, through the referral server, a connection between the client device and the financial platform server.

In some embodiments of the present technology, the method further comprises: forwarding, from the referral server to the client device, a message containing at least one question; and receiving, at the referral server from the client device, a reply to the at least one question; the referral server further using the reply to the at least one question to determine the behavioural attribute of the user.

In some embodiments of the present technology, the at least one question relates to a topic of interest of the user; and the behavioural attribute of the user comprises an expected purchase related to the topic of interest of the user.

In some embodiments of the present technology, the at least one question relates to a financial concern of the user; and the behavioural attribute of the user is related to the financial concern of the user.

In some embodiments of the present technology, the method further comprises: forwarding, from the referral server to the client device, an HTML inline frame causing the client device to display a window containing the at least one question and a field allowing the user to provide the reply to the at least one question.

In some embodiments of the present technology, analysing the financial information of the user to determine the one or more behavioural attributes of the user comprises considering an element reflected in the financial information of the user, the element being selected from a type of a recent purchase, an amount of a recent financial transaction, a type of a recent financial transaction, an average spending rate, a current account balance, a lowest monthly account balance, a regular salary of the user, and a combination thereof.

In some embodiments of the present technology, financial information of the user comprises a plurality of behavioural attributes, each behavioural attribute being an element of a vector defining the behavioural profile of the user.

In some embodiments of the present technology, the method further comprises: sending, by the referral server to a client device of the user, a code sequence related to a marketing campaign selected according to the behavioural profile of the user.

In some embodiments of the present technology, the method further comprises: defining, at the referral server, a plurality of marketing campaigns related to the behavioural profile of the user; calculating, at the referral server, a conversion rate for each of the marketing campaigns; and selecting, by the referral server, one of the plurality of marketing campaigns having a highest conversion rate.

In some embodiments of the present technology, the conversion rate is calculated at least in part on the behavioural profile of the user.

In some embodiments of the present technology, the method further comprises: receiving, at the referral server, past conversion outcomes for the marketing campaign; and factoring, at the referral server, the past conversion outcomes in the calculation of the conversion rate.

In another aspect, various implementations of the present technology provide a referral server, comprising:
- a network interface adapted for communicating with a client device and with a financial platform server;
- a processor operatively connected to the network interface; and
- a non-transitory computer-readable medium having stored thereon machine executable instructions for performing, when executed by the processor, the method for providing a targeted advertisement to a user.

In a further aspect, various implementations of the present technology provide a referral server, comprising:
- a network interface adapted to communicate with a client device, a financial platform server and an advertisement server; and
- a processor operatively connected to the network interface, the processor being configured to:
  - cause the network interface to send, to the financial platform server, a request for fetching the financial information of a user,
  - receive, from the network interface, a reply containing the financial information of the user,
  - analyse the financial information of the user to determine one or more behavioural attributes of the user, and
  - use the one or more behavioural attributes of the user to define the behavioural profile of the user.

In some embodiments of the present technology, the referral server further comprises:
- a memory device operatively connected to the processor, the memory device being adapted to store:
  - a table of relations between user identities and behavioural profiles, and
  - a table of relations between the behavioural profiles and related marketing campaign;
- the processor being further configured to use the behavioural profile of the user to select a marketing campaign for the user.

In yet another aspect, various implementations of the present technology provide a network, comprising:
- a client device of a user;
- a financial platform server;
- an advertisement server;
- an external application server; and
- a referral server communicatively coupled to the client device, the financial platform server and the advertisement server, the referral server being configured to:
  - send, to the financial platform server, a request for fetching the financial information of the user,
  - receive, from the financial platform server, a reply containing the financial information of the user,
  - analyse the financial information of the user to determine one or more behavioural attributes of the user, and
  - use the one or more behavioural attributes of the user to define the behavioural profile of the user.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology introduces a referral server in communication with a client device, a financial platform server, and at least one advertisement server. The referral server gains a consent from a user of the client device to access financial information of the user in the financial platform server. The referral server determines a behavioural attribute of the user based on the financial information. The behavioural attribute of the user is used by an advertisement server to forward targeted advertisement to the client device.

With these fundamentals in place, we will now consider some non-limiting examples to illustrate various implementations of aspects of the present technology.

Figure 1:
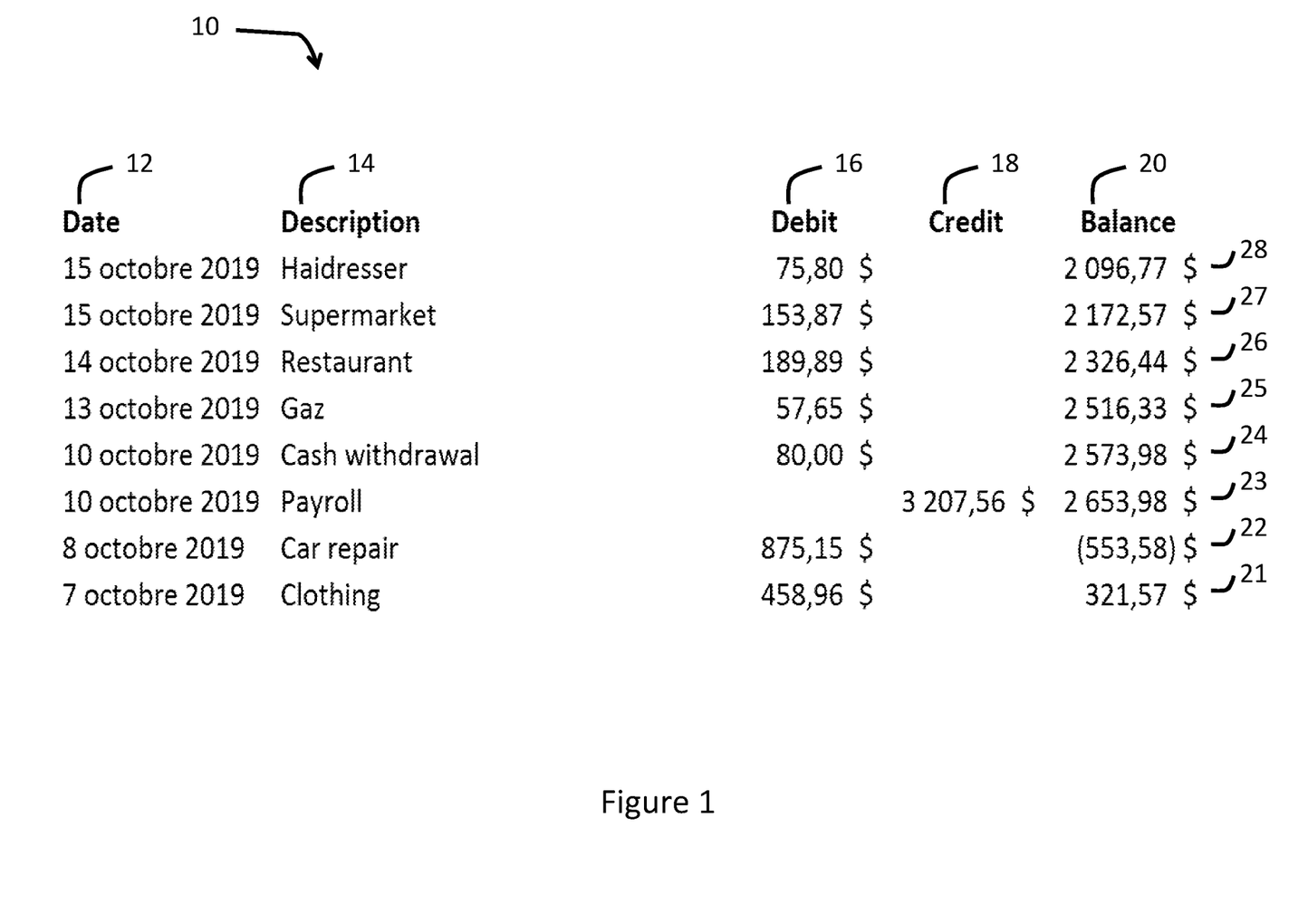
FIG. 1 is an illustration of a typical user account listing obtained from a financial institution.

FIG. 1 is an illustration of a typical user account listing obtained from a financial institution. A user account listing 10 is in the form of a table having a plurality of columns and a plurality of rows. A column 12 provides a date for each transaction in the user's account. A column 14 provides a description that, in a real-life implementation, would usually provide the name of a commercial institution involved in the transaction. A column 16 shows an amount debited from the user's account, when the transaction consists of an expenditure. A column 18 shows an amount credited to the user's account, for example a payment of the user's salary or a money transfer from another account. A column 20 shows an account balance for the user. Rows 21-28 are respectively provided for each transaction, the most recent transaction depicted on row 28 being shown at the top of the user account listing 10. The example of FIG. 1 may be for a checking account. Other listings may be provided for a savings account, for a credit card account, and the like.

Very significant information of a private nature may be obtained from the user account listing 10. For example, row 22 shows a negative account balance on Oct. 8, 2019, resulting from significant payments made on that date and on the previous day (row 21), a few days before the pay date (row 23) for the user. While this situation may be understood as entirely normal, it may also be indicative of problems, particularly when the user's account frequently has a negative balance. Other private information that may be obtained from the user account listing 10 includes the type of expenses that the user is likely to make on a regular basis, as shown for example on rows 24-28.

Figure 2:
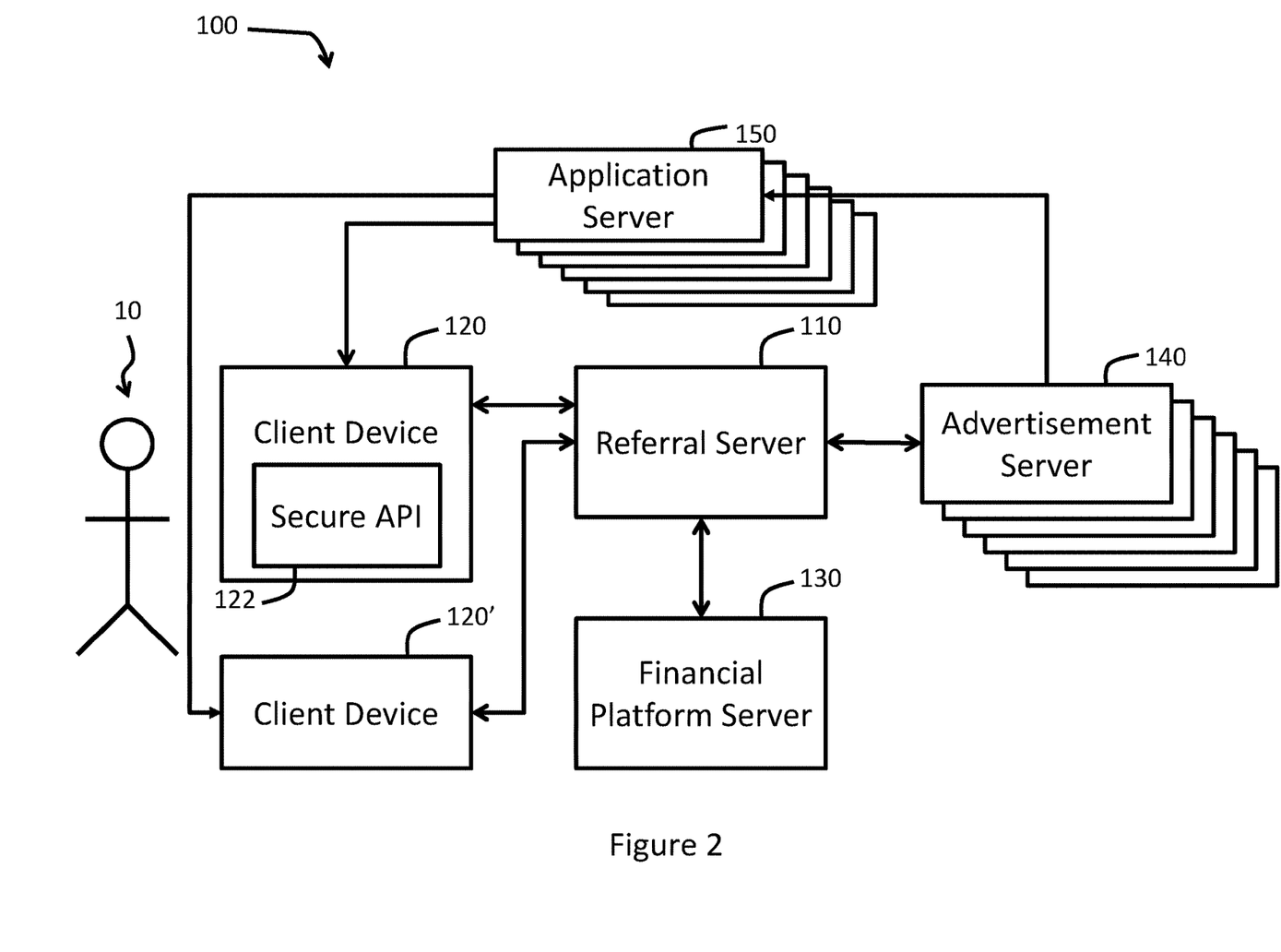
FIG. 2 is a block diagram of a network for providing a targeted advertisement to a user in accordance with an embodiment of the present technology.

FIG. 2 is a block diagram of a network for providing a targeted advertisement to a user in accordance with an embodiment of the present technology. A network 100 includes a referral server 110, a client device 120 operated by a user 10, a financial platform server 130, a plurality of advertisement servers 140, and a plurality of external application servers 150. In turn, the client device 120 includes a secure application programming interface (API) 122. The user 10 may have access to one or more additional client devices, including for example a client device 120'.

Figure 6:
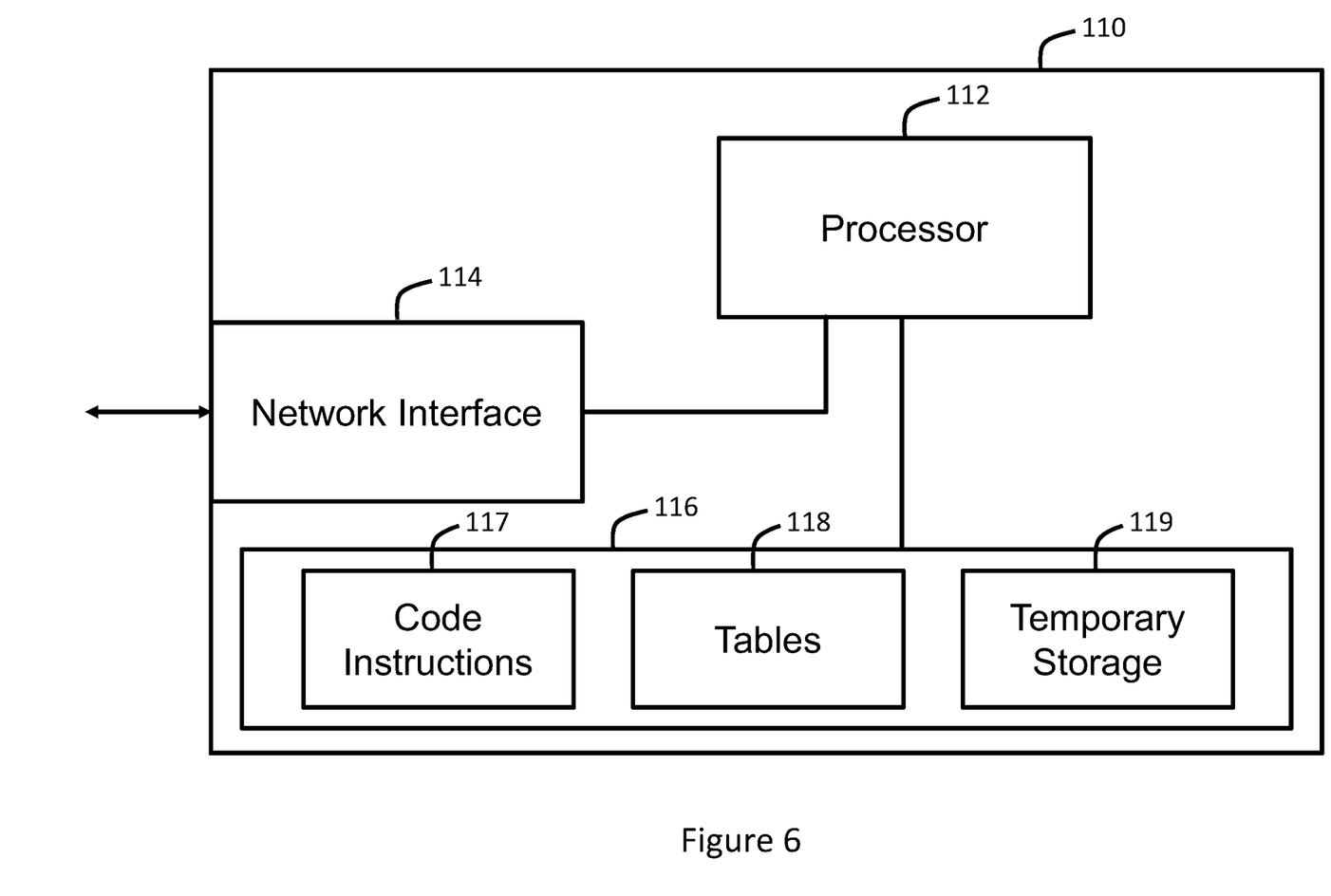
FIG. 6 is a block diagram of a referral server in accordance with an embodiment of the present technology.

Each of the client devices 120 and 120' may be a personal computer, a laptop computer, an intelligent mobile terminal, a tablet, and the like. FIG. 6, which is introduced below, provides a detailed description of the referral server 110. The financial platform server 130 may be a computer, a server, or a group of cooperating computers or servers. The financial platform 130 may be hosted by (or on behalf of) a financial institution, for example a bank, a credit union, an insurance company, a finance company, a credit card issuer, and the like. The financial platform server 130 may alternatively be hosted by any commercial institution hosting accounts for its clients, for example an online money transfer service such as TransferWise™. Each advertisement server 140 may be a computer, a server, or a group of cooperating computers or servers hosted in a datacenter and providing services to one or more advertisement companies.

The referral server 110 is communicatively coupled over secure connections to the client device 120 and to the financial platform server 130. Security requirements may potentially be less stringent for communication between the referral server 110 and the one or more advertisement servers 140 and/or between the one or more advertisement servers 140, the one or more external application servers 150, and the client devices 120 and 120'.

In the network 100, the referral server 110 may receive, from the secure API 122 of the client device 120, a secure identity of the user 10 and an authorization for accessing financial information of the user 10 of the client device 120. The secure identity of the user 10 and the authorization may be in the form of a login of the user 10 on the referral server 110. The authorization may be explicit. The authorization may alternatively be implicit, given that the secure identity of the user 10 is provided by the secure API 122. In response to receiving the authorization, the referral server 110 sends to the financial platform server 130 a request for fetching the financial information of the user 10. Having received, from the financial platform server 130 a reply containing the financial information of the user 10, the referral server 110 analyses the financial information of the user 10 to determine one or more behavioural attributes of the user 10.

The determination of the behavioural attributes of the user 10 may be made in various manners, some of which may be simple while others may be quite elaborate. Considering the example of FIG. 1, seeing that the user 10 account listing 10 shows a larger amount being spent in a restaurant on October 14 than in a supermarket on October 15, it may be possible to infer that the user 10 is willing to spend more to eat out than to eat at home. In one example, the referral server 110 may conclude that the user 10 prefers to eat out and this conclusion may be reflected in the determined behavioural attributes of the user 10. Of course, a real-life user account listing would provide a longer list of expenditures; longer term trends found in expenditures of the user 10 might confirm or infirm such conclusion.

In another example, the fairly large expense shown on row 22, in which an expensive car repair was made, may lead the referral server 110 to reflect, in the determined behavioural attributes of the user 10, that a new car purchase is possible. In a further example, the negative account shown on row 22 may indicate that the user 10 is having financial difficulties that may impact future spending habits. In yet other examples not illustrated on FIG. 1, the purchase of a new car or of a new home may lead to defining a need to buy car or home insurance as a behavioural attribute of the user 10. Machine learning and other artificial intelligence tools may be used in the determination of the behavioural attributes of the user 10.

Having determined one or more behavioural attributes of the user 10, the referral server 110 determines a behavioural profile for the user 10. The referral server 110 may place the secure identity of the user 10 in a table of relations between user identities and behavioural profiles. A theoretical example is presented in Table I.

TABLE I

| Secure Identity | Behavioural Profile |
|---|---|
| HJW428955 | Graduate student having a girlfriend |
| KU867P32I | Single high income condo owner |
| GOAEW747 | Adventurer |

Table I contains entries for only three users; in a realistic implementation, the table of relations between user identities and behavioural profiles may contain thousands or tens of thousands of entries. Various users may be given the same behavioural profile.

Each behavioural profile may be related to one or more corresponding marketing campaigns. A relation between the behavioural profiles and the marketing campaigns may be based on a contractual agreement between an operator of the referral server 110 and operators of the advertisement servers 140 e.g. advertising agencies). A theoretical example of a marketing campaign table is presented in Table II.

TABLE II

| Behavioural Profile | Marketing Campaign | Conversion Rate $\theta_k$ |
|---|---|---|
| Graduate student having a girlfriend | Wedding Planners | $\theta_a$ |
| | Florist | $\theta_b$ |
| Single high-income condo owner | Luxury Cars | $\theta_c$ |
| | Travel | $\theta_d$ |
| Adventurer | Adventure Travel | $\theta_e$ |
| | Day Trading | $\theta_f$ |

The behavioural profiles and marketing campaigns shown in Tables I and II are for illustration purposes only and may not be representative of real-life implementations. Entries in the marketing campaign column may for example contain names of actual goods and services providers. Values for the conversion rate $9k$ may be calculated as described hereinbelow.

The referral server 110 may provide information the client devices 120 and 120' for causing the client devices 120 and 120' to store a code sequence. The code sequence may be, for example and without limitation, in the form of a Facebook Pixel™ for access to Facebook as the external application. Other equivalent code sequences may be stored in the client devices 120 and 120' for other external applications. Instead of, or in addition to storing the code sequence, storing a tag in the client devices 120 and 120' is also contemplated. The code sequence, or the tag, associates the user 10 to a selected one of the marketing campaigns defined for the behavioural user profile of the user 10. Later, when the user 10 will use the client device 120 or 120' to connect to an external application, the code sequence executed in the client device 120 or 120' will inform the external application of the marketing campaign selected for the user 10 so that the external application may cause the client device 120 or 120' to display relevant advertisements for the marketing campaign.

As illustrated in Table II, more than one marketing campaign may be mapped to each behavioural profile. The referral server 110 may implement any method of selecting a particular marketing campaign for the user 10 when more than one is mapped to a given behavioural profile. In non-limiting embodiments, the marketing campaigns mapped to one behavioural profile may be randomly selected, selected in a round-robin fashion, and the like. Other embodiments may use the conversion rate θk calculated for each marketing campaign.

At any time after the creation or update of her/his entry in the table of relations, the user 10 may access any one of various social media applications or other applications using the client device 120 or 120'. The code sequence stored in the client device 120 or 120' (for example the Facebook Pixel if the user 10 is accessing the Facebook application) causes the application server 150 to fetch, from an appropriate advertisement server 140, an advertisement related to the marketing campaign that, in turn, is based on the behavioural profile of the user 10. The fetched advertisement is displayed on the client device 120 or 120' in the usual manner for the external application.

The contractual agreement between the operator of the referral server 110 and the advertising agencies may impact the manner in which the operator of the referral server 150 is compensated. In a simple, non-limiting embodiment, the operator of the referral server 110 may be compensated whenever a targeted advertisement is delivered to the user 10.

In a non-limiting embodiment, the referral server 110 may select the marketing campaign for the user 10 based on the objective of maximizing the conversion rate $\theta_k$, which is a probability of success for an advertisement presented to the user 10. In this context, user conversion may be defined in any one of a plurality of manners defined by the contractual agreement. For example and without limitation, user conversion may be considered successful when the user 10 selects (e.g. by clicking) an advertisement displayed on the client device 120 or 120', or when the user 10 performs an online purchase after selecting the advertisement. In such embodiments, marketing campaigns leading to higher expected conversion rates $\theta_k$ may be selected in priority for delivery to the user 10. Monetary compensation to the referral server 110 based on the actual conversions and actual decision points for determining that conversions are successful are outside the scope of the present technology and do not limit the present disclosure.

Various techniques may be used to predict the conversion rate $\theta_k$ for an advertisement. Some of these techniques may involve the use of machine learning and/or deep learning. For example and without limitation, the conversion rate $\theta_k$ representing a probability of conversion of a targeted advertisement may be calculated using a framework known as a Deep Contextual Multiarmed Bandit. According to this framework, an algorithm is fed with a prior conversion rate $\theta_k$, which is updated using Bayes rule to calculate a new value for the conversion rate $\theta_k$.

Considering an entry for a given behavioural profile in the marketing campaign table (left column of Table II) and considering that k marketing campaigns are available for the given behavioural profile (right column of Table II), an actual conversion result following the display of the advertisement to the user 10 may either represent a success (a conversion) or a failure (no conversion). As mentioned earlier, the notion of success or failure may depend on the contractual agreement between the operator of the referral server 110 and the advertising agencies. For illustration purposes and without loss of generality, one advertisement $Ad_k$ may be identified for each marketing campaign. The expected conversion rate (success probability) $\theta_k$ is calculated for each particular advertisement $Ad_k \in \{1, \ldots, k\}$ using equation (1):

$$\theta k(x) = \frac{1}{1 + \exp(-f(x))} \quad (1)$$

In equation (1), x is a context vector related to the behavioural profile of the user 10 that, in turn, is based on the financial information of the user 10. The calculated value of $\theta_k$ in a range of (0,1), in which a value 0 indicates that conversion is certain to fail and a value 1 indicates that conversion is certain to succeed. Realistic values for $\theta_k$ are expected to be greater than 0 and smaller than 1. In an embodiment where k advertisements (one per marketing campaign) are defined for a given behavioural profile defined by the vector x, the referral server may select the actual advertisement (i.e. the actual marketing campaign) having the highest calculated value of $\theta_k$ or, equivalently, the highest conversion probability.

The function $f(x)$ may for example be a simple linear function of the Income and DebtRatio attributes, as shown for example in equation (2)

$$f(x) = \beta_0 + \beta_1 * x_1 + \beta_2 * x_2 + \varepsilon \quad (2)$$

In equation (2), each value $x_i$ may represent a particular piece of financial information for the user 10. The vector $x = \{x_1, x_2, \ldots, x_n\}$ is thus the behavioural profile of the user 10. For example $x_1$ could be the 30-day income of the user, $x_2$ their debt ratio, and $\varepsilon$ may be a constant representing noise with a standard normal distribution. Table III provides a number of non-limiting examples of behavioural attributes of the vector x defining the behavioural profile of the user 10.

TABLE III

| Behavioural Attribute Definition | Coded Attribute Name |
| --- | --- |
| Sum, Telecom Payments, 90 Days | sum_telecom_payments_90_days |
| Sum, Telecom Payments, 365 Days | sum_telecom_payments_365_days |
| Sum of Total Income, Last 90 Days | sum_total_income_90_days |
| Sum of Total Income, Last 365 Days | sum_total_income_365_days |
| Sum, Insurance Payments, 90 Days | sum_insurance_payments_90_days |
| Sum, Insurance Payments, 365 Days | sum_insurance_payments_365_days |
| Sum of Auto Loan Payments, 90 Days | sum_auto_loan_payments_90_days |
| Sum of Auto Loan Payments, 365 Days | sum_auto_loan_payments_365_days |
| Sum, Mortgage Payments, 90 Days | sum_mortgage_payments_90_days |
| Sum, Mortgage Payments, 365 Days | sum_mortgage_payments_365_days |
| Sum, Total Debits, 90 Days | sum_total_debits_90_days |
| Sum, Total Debits, 365 Days | sum_total_debits_365_days |
| Sum, Total Credits, 90 Days | sum_total_credits_90_days |
| Sum, Total Credits, 365 Days | sum_total_credits_365_days |
| Sum, Employer Income, Last 90 Days | sum_employer_income_90_days |
| Sum, Employer Income, Last 365 Days | sum_employer_income_365_days |
| Sum, Micro Loan Payments, 90 Days | sum_micro_loan_payments_90_days |
| Sum, Micro Loan Payments, 365 Days | sum_micro_loan_payments_365_days |

In an embodiment, the values contained in the right column of Table III may be stored in Table I for each user 10.

In equation (2), values $\beta_i$ may be parameters that will be learned as time goes by. Each $\beta_i$ may be understood as describing the "power" of an attribute to cause the user 10 to act upon an advertisement or, otherwise stated, to lead to a successful conversion. Each $\beta_i$ may be assumed to be normally distributed, i.e. to have a distribution corresponding to equation (3):

$$\beta_i = N(m_i, q_i^{-1}) \qquad (3)$$

Wherein $m_i$ is the mean and $q_i$ is the inverse of the standard deviation of the normal distribution for $\beta_i$. These values may be initialized arbitrarily, given a lack of prior information for values of $\beta_i$. For example, $m_i$ may initially be set to 50% as an initial expected conversion probability. This initial value has little consequence because the values of $m_i$ and $q_i$ will be updated algorithmically over a period of time T.

In an embodiment, the values of $m_i$ and $q_i$ will be updated over the period time T according to operations described in equations (4) and (5). First, equation (4) will find a minimizer of a parameter $w_i$:

$$\frac{1}{2}\sum_{n=1}^{d} q_i(w_i - m_i)^2 + \sum_{j=1}^{n} \log(1 + \exp(1 + -y_j w^T x_j)) \qquad (4)$$

In equation (4), $y_j$ represent past conversion outcomes, which are either equal to 0 or 1, respectively for unsuccessful and successful outcomes. d is a number of parameters $\beta_i$. n is a number of observed outcomes $y_j$. The past conversion outcomes may be received at the referral server 110, from the advertisement servers 140, at various intervals over the period of time T.

Then, $m_i$ will be set equal to $w_i$, and a Laplace approximation will be calculated using equation (5):

$$q_i = q_i + \sum_{j=1}^{n} x_{ij} p_j (1 - p_j), \text{ where } p_j = 1 + \exp(1 + -w^T x_j)^{-1} \qquad (5)$$

It may be noted that the Multiarmed Bandit framework may alternatively use other algorithms for learning relationships between inputs and outputs. The mathematical model expressed in equations (1) to (5) may therefore be substituted with other algorithms adapted to provide the same or equivalent results.

Figure 3:
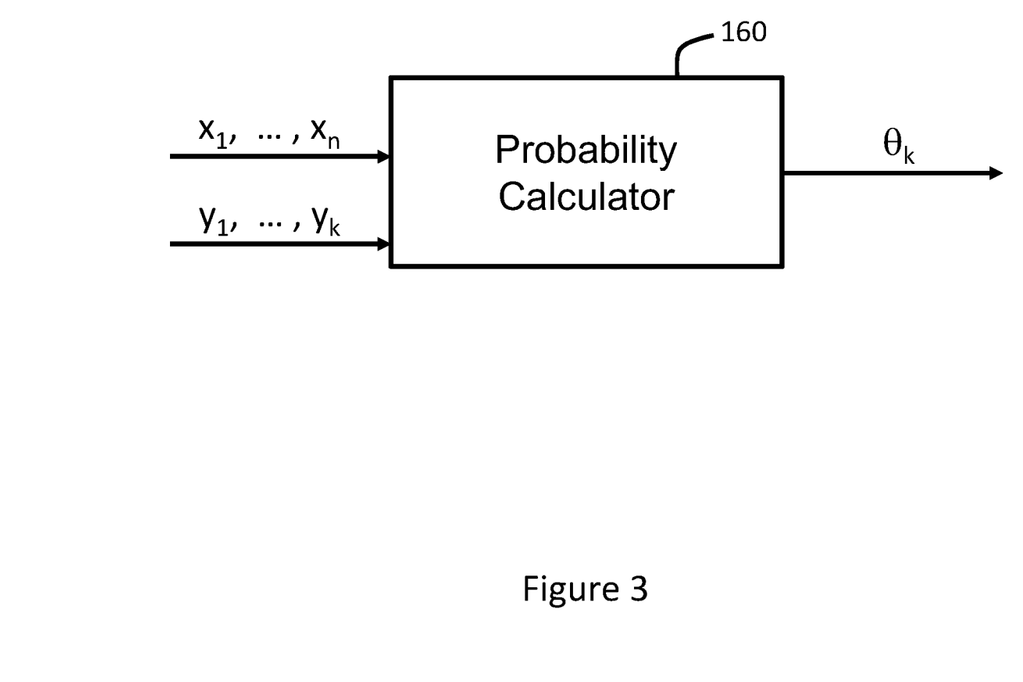
FIG. 3 is a block diagram of a probability calculator implemented in the referral server in accordance with an embodiment of the present technology.

FIG. 3 is a block diagram of a probability calculator implemented in the referral server. A probability calculator 160 may apply the behavioural profile $x_1, \ldots, x_n$ of the user 10 and reported past conversion outcomes $y_1, \ldots, y_k$ for the k advertisements (or k marketing campaigns) to the above described mathematical model and output the success probabilities $(\theta_1, \ldots, \theta_K)$ for the k advertisements (or k marketing campaigns) available for the behavioural profile of the user 10. The referral server 110 may then populate the right most column of the marketing campaign table (Table II) and use the conversion probabilities to select the marketing campaign for the user 10.

Figure 4A:
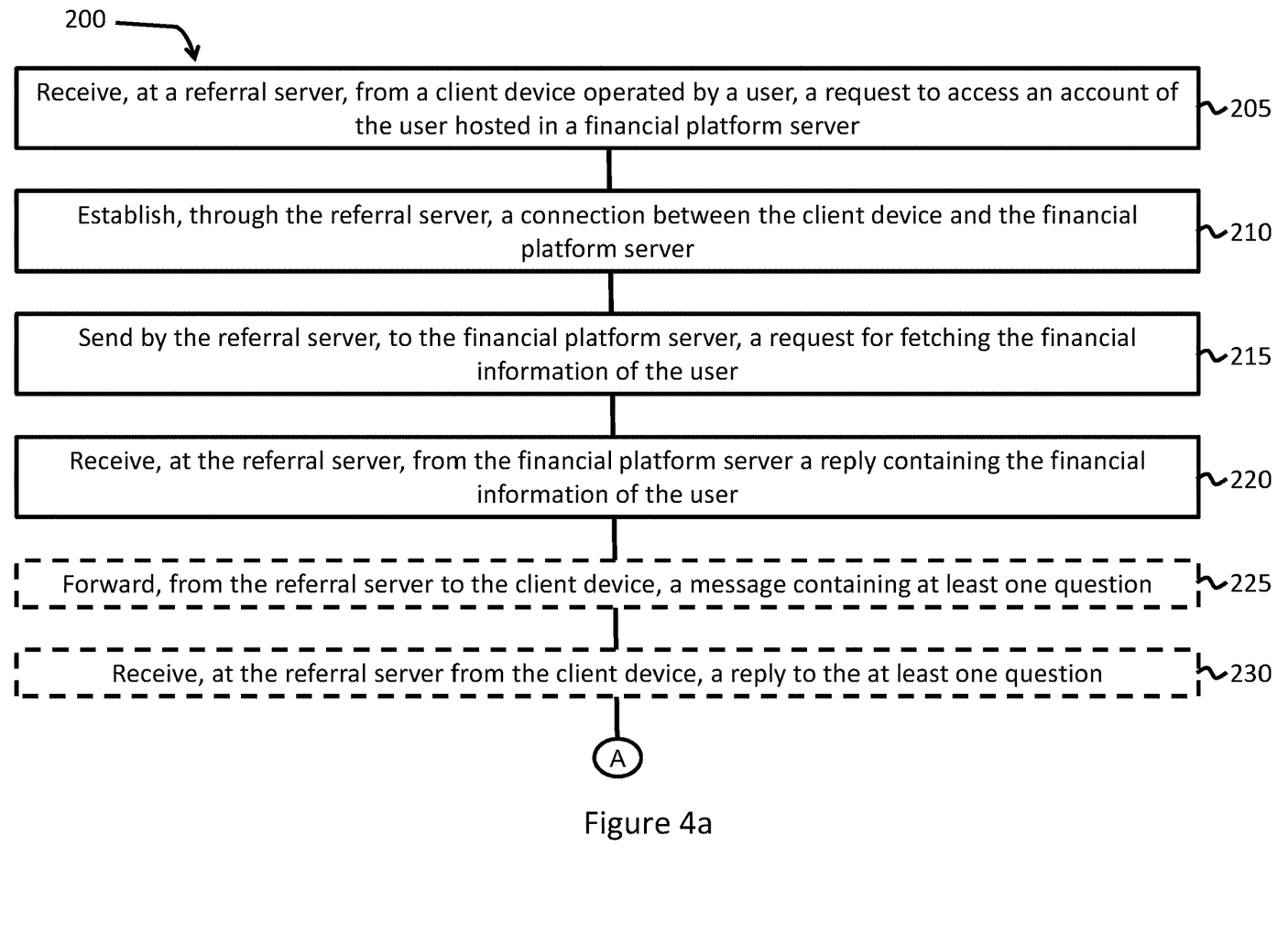
FIGS. 4a and 4b are a sequence diagram showing operations of a method for determining a behavioural profile of a user in accordance with an embodiment of the present technology.
Figure 4B:
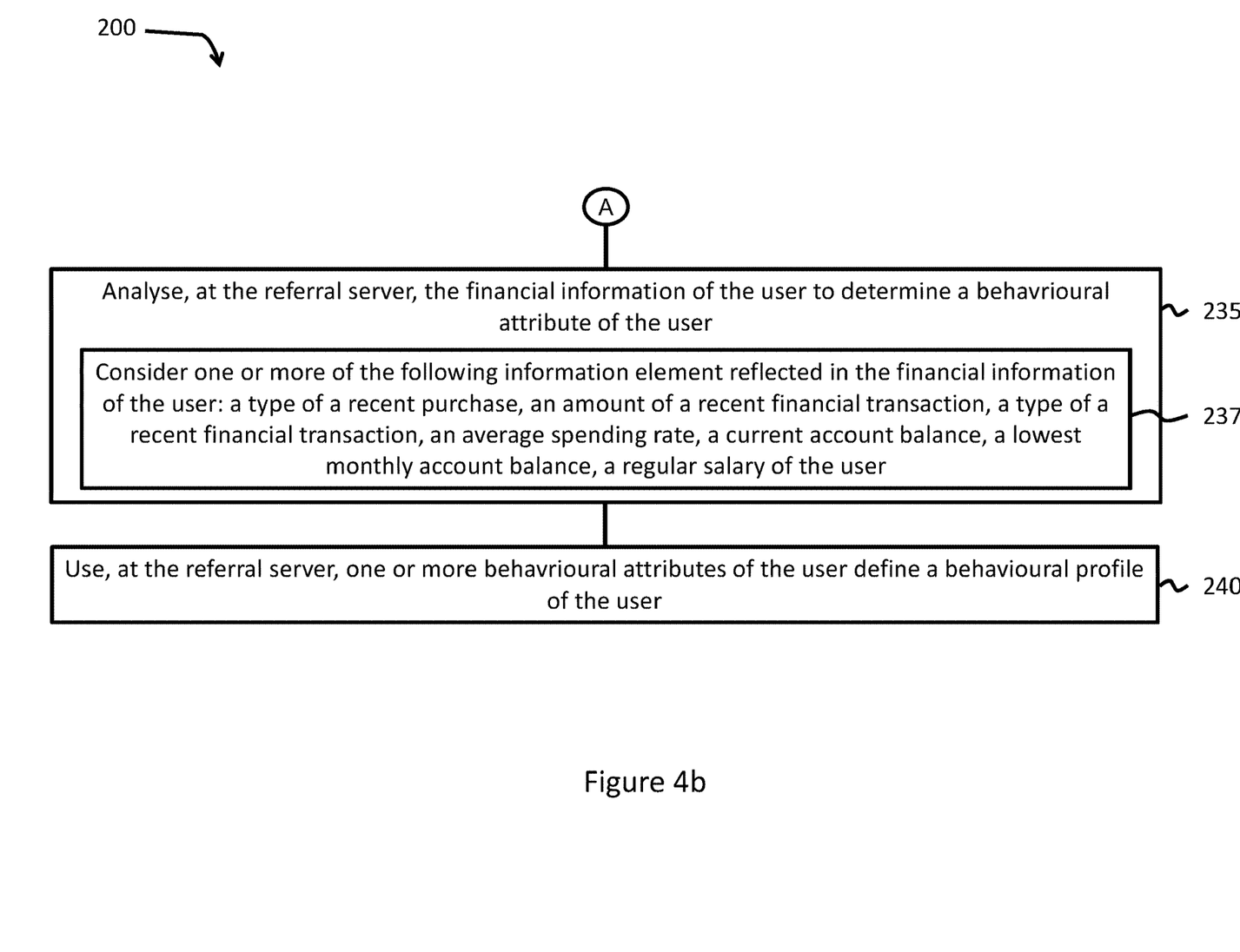

FIGS. 4a and 4b are a sequence diagram showing operations of a method for determining a behavioural profile of a user in accordance with an embodiment of the present technology. On FIGS. 4a and 4b, a sequence 200 comprises a plurality of operations, some of which may be executed in variable order, some of the operations possibly being executed concurrently, some of the operations being optional.

The sequence 200 may begin at operation 205 when the referral server 110 receives, from the client device 120, a request to access an account of the user 10 hosted in the financial platform server 130. The request may have originated in the secure API 122 of the client device 120 and the request may use a secure identity to identify the user 10, which effectively provides authorization for the referral server 110 to access the access of the user 10 on the financial platform server 130. A connection is established at operation 210, through the referral server 110, between the client device 120 and the financial platform server 130. At operation 215, the referral server 110 sends to the financial platform server 130 a request for fetching the financial information of the user 10.

Then at operation 220, the referral server 110 receives, from the financial platform server 130, a reply containing the financial information of the user. The referral server 110 may optionally forward to the client device 120 a message containing at least one question at operation 225. The at least one question may be selected from a list of questions based on the financial information of the user 10. As an illustrative example, the question may enquire whether the user 10 desires to receive investment advice if the financial information shows a high positive balance in a low interest account of the user 10. The message containing the at least one question may comprise an HTML inline frame causing the client device 120 to display a window containing the at least one question and a field allowing the user to provide the reply to the at least one question. At operation 230, the referral server 110 receives a reply to the at least one question from the client device 120. A non-limiting example of a question may ask whether the user 10 needs help in rebuilding her/his credit score.

At operation 235, the referral server 110 analyses the financial information of the user to determine a behavioural attribute of the user 10. Operation 235 may include sub-operation 237, in which the referral server 110 may consider one or more of the following information elements reflected in the financial information of the user: a type of a recent purchase, an amount of a recent financial transaction, a type of a recent financial transaction, an average spending rate, a current account balance, a lowest monthly account balance, a regular salary of the user. Other information elements that the referral server 110 may consider are those contained in Table III. The referral server 110 may further use the reply to the at least one question to determine the behavioural attribute of the user 10. In a non-limiting example, the at least one question relates to a topic of interest of the user 10 and the behavioural attribute of the user 10 comprises an expected purchase related to the topic of interest of the user. In another non-limiting example, the at least one question relates to a financial concern of the user 10 and the behavioural attribute of the user 10 is related to the financial concern of the user 10. In a further example where the financial concern of the user 10 relates to retirement savings, the behavioural attribute of the user 10 may be related to upcoming long-term investments.

At operation 240, the referral server 110 may combine one or more behavioural attributes of the user 10 to form a behavioural profile for the user 10. In an embodiment, a single behavioural attribute of the user 10 may from the behavioural profile for the user 10. In another embodiment, the behavioural profile for the user 10 may be selected from a list of behavioural profiles that map each behavioural profile to a number of related behavioural attributes.

It may be noted that, once the sequence 200 is completed, the behavioural profile of the user 10 has been obtained based on the financial information of the user 10. The behavioural profile of the user 10 is therefore related to real-life events (e.g. expenses) of the user 10, rather than being merely related to web-browsing and like activities of the user 10. It may also be noted that some of the operations of the sequence 200 may be repeated for the user 10, from time to time, at regular intervals, or when life-events may change some of the user's behavioural attributes. The behavioural profile of the user 10 may therefore change over the weeks or months.

Figure 5:
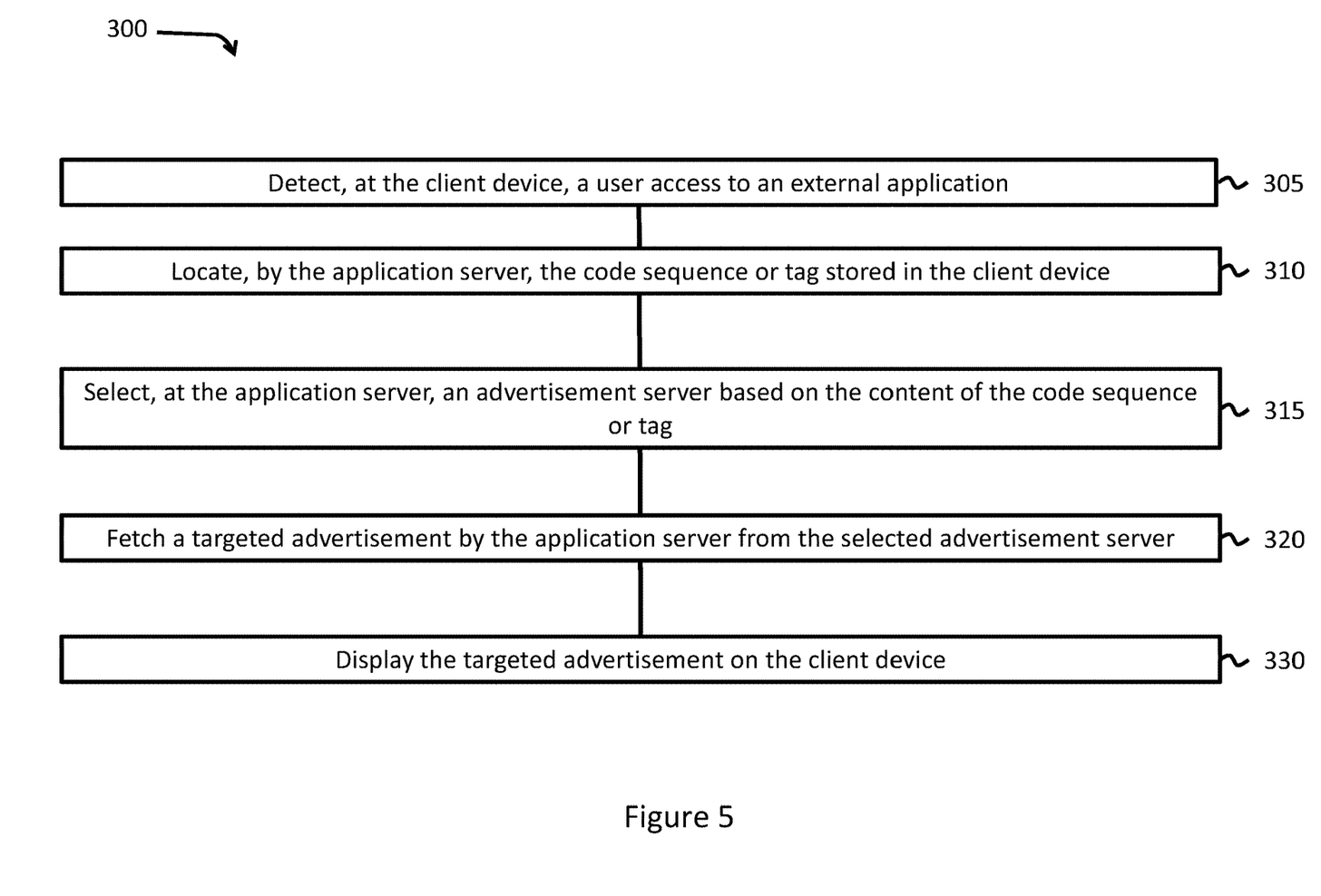
FIG. 5 is a sequence diagram showing operations of a method for providing a targeted advertisement to a user in accordance with an embodiment of the present technology.

FIG. 5 is a sequence diagram showing operations of a method for providing a targeted advertisement to a user in accordance with an embodiment of the present technology. On FIG. 5, a sequence 300 comprises a plurality of operations, some of which may be executed in variable order, some of the operations possibly being executed concurrently, some of the operations being optional.

The sequence 300 normally follows the sequence 200, in which a behavioural profile has been assigned to the user 10. The sequence 300 may begin at operation 305, when the client device 120 or 120' detects an access of the user 10 to an external application, for example Facebook, Instagram, or LinkedIn. At operation 310, the application server 150 for the external application being accessed locates the code sequence (or tag) stored in the client device 120 or 120'. At operation 315, the application server 150 selects one of the advertisement servers 140 based on the content of the code sequence (or tag) that, in turn, relates to the behavioural profile of the user 10 and to a corresponding marketing campaign.

At operation 320, the application server 150 fetches a targeted advertisement from the selected advertisement server 140. The application server 150 causes the client device 120 or 120' to display the targeted advertisement at operation 325, for example within a screen window defined by the external application being accessed by the user 10.

Each of the operations of the referral server 110 in the sequence 200 may be configured to be processed by one or more processors, the one or more processors being coupled to a memory device. For example, FIG. 6 is a block diagram of a referral server in accordance with an embodiment of the present technology. On FIG. 6, the referral server 110 includes a processor or a plurality of cooperating processors (represented as a processor 112 for simplicity), a network interface or a plurality of network interfaces (represented as a network interface 114) and a memory device or a plurality of memory devices (represented as a memory device 116 for simplicity). The processor 112 is operatively connected to the network interface 114 and to the memory device 116. The network interface 114 is configured to connect securely with the client device 120 and with the financial platform server 130. The network interface 114 also communicates with the advertisement servers 140, via a connection that may potentially have less stringent security requirement. The memory device 116 comprises a non-transitory computer-readable medium 117 for storing machine executable instructions that are executable by the processor 112. For example, the machine executable instructions stored in the non-transitory computer-readable medium 117 may be executed by the processor 112 to perform the functions of the referral server 100 included in the sequence 200 of FIGS. 4a and 4b. The memory device 116 also contains a database 118 for storing the table of relations between user identities and the behavioural profiles (Table I) and the marketing campaign table (Table II). The memory device 116 further contains a temporary storage 119 storing partial results of ongoing operations and calculations.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for retrieving a financial transaction history of a user and generating a behavioural profile of the user, the method comprising:

receiving, by a referral server and via a secure API of a client device of the user, a request to access a financial account of the user hosted by a financial platform server;

establishing, by the referral server, a connection between the client device and the financial platform server;

sending, by a referral server, to the financial platform server, a request for fetching financial information of the user;

receiving, by the referral server, from the financial platform server, a reply containing a financial transaction history of the user;

sending, by the referral server and to the client device, an HTML inline frame comprising a question for the user, wherein the question is selected based on the financial transaction history of the user, and wherein the HTML inline frame comprises a field for the user to provide a reply to the question;

receiving, by the referral server and from the client device, the reply to the question;

analysing, at the referral server, financial transaction history of the user to determine a plurality of behavioural attributes of the user; and determining, by the referral server and based on the reply to the question, an additional behavioural attribute of the user;

combining, by the referral server, the plurality of behavioural attributes of the user and the additional behavioural attribute to form a behavioural profile of the user;

determining, at the referral server, a plurality of marketing campaigns associated with the behavioural profile;

determining, at the referral server, and based on past conversion outcome data corresponding to the plurality of marketing campaigns and based on parameters of the behavioural profile of the user, a predicted conversion rate for each marketing campaign of the plurality of marketing campaigns;

selecting, by the referral server, the marketing campaign having a highest predicted conversion rate of the plurality of marketing campaigns;

sending, by the referral server and to a client device of the user, a code sequence related to the marketing campaign; and sending, by the referral server to the client device, and based on the code sequence, a targeted advertisement corresponding to the marketing campaign.

2. The method of claim 1, wherein:
the question relates to a topic of interest of the user; and
the additional behavioural attribute of the user comprises an expected purchase related to the topic of interest of the user.

3. The method of claim 1, wherein:
the question relates to a financial concern of the user; and
the additional behavioural attribute of the user is related to the financial concern of the user.

4. The method of claim 1, wherein analysing the financial transaction history of the user to determine the plurality of behavioural attributes of the user comprises considering an element reflected in the financial transaction history of the user, the element being selected from a type of a recent purchase, an amount of a recent financial transaction, a type of a recent financial transaction, an average spending rate, a current account balance, a lowest monthly account balance, a regular salary of the user, and a combination thereof.

5. The method of claim 1, further comprising generating, based on the financial transaction history, a vector defining the behavioural profile of the user.

6. The method of claim 1, wherein the financial transaction history comprises a list of expenditures by the user.

7. The method of claim 1, wherein the financial transaction history comprises an account balance of a financial account of the user.

8. The method of claim 1, wherein determining the predicted conversion rate for each marketing campaign comprises predicting the conversion rates using a deep contextual multiarmed bandit algorithm.

9. The method of claim 1, further comprising:
determining, based on the financial transaction history, an income of the user; and
determining, based on the financial transaction history, a debt ratio of the user,
wherein determining the predicted conversion rate for each marketing campaign comprises predicting the conversion rates based on the income and the debt ratio.

10. The method of claim 1, further comprising determining, based on the financial transaction history, an income of the user over a predetermined time period, and wherein determining the predicted conversion rate for each marketing campaign comprises predicting the conversion rates based on the income over the predetermined time period.

11. A referral server, comprising:
at least one processor and memory storing a plurality of executable instructions which, when executed by the at least one processor, cause the referral server to:

receive, from a secure API of a client device of a user, a request to access a financial account of the user hosted by a financial platform server, establish a connection between the client device and the financial platform server, send, to the financial platform server, a request for fetching financial information of the user, receive, from the financial platform server, a reply containing a financial transaction history of the user, send, to the client device, an HTML inline frame comprising a question for the user, wherein the question is selected based on the financial transaction history of the user, and wherein the HTML inline frame comprises a field for the user to provide a reply to the question, receive, from the client device, the reply to the question, analyse the financial transaction history to determine a plurality of behavioural attributes of the user, determine, based on the reply to the question, an additional behavioural attribute of the user, combine the plurality of behavioural attributes of the user and the additional behavioural attribute to form a behavioural profile of the user, determine a plurality of marketing campaigns associated with the behavioural profile, determine, based on past conversion outcome data corresponding to the plurality of marketing campaigns and based on parameters of the behavioural profile of the user, a predicted conversion rate for each marketing campaign of the plurality of marketing campaigns, select the marketing campaign having a highest predicted conversion rate of the plurality of marketing campaigns, send, to the client device, a code sequence related to the marketing campaign, and send, to the client device and based on the code sequence, an advertisement corresponding to the marketing campaign.

12. The referral server of claim 11, wherein the memory stores: a table of relations between user identities and behavioural profiles, and a table of relations between the behavioural profiles and related marketing campaigns.

* * * * *